(12) United States Patent
Giacalone, Jr.

(10) Patent No.: US 7,136,906 B2
(45) Date of Patent: *Nov. 14, 2006

(54) SYSTEM FOR ELECTRONICALLY DISTRIBUTING, DISPLAYING AND CONTROLLING THE PLAY SCHEDULING OF ADVERTISING AND OTHER COMMUNICATIVE MEDIA

(75) Inventor: Louis D. Giacalone, Jr., Las Vegas, NV (US)

(73) Assignee: Clarity Visual Systems, Inc., Wilsonville, OR (US)

( * ) Notice: Subject to any disclaimer, the term of this patent is extended or adjusted under 35 U.S.C. 154(b) by 591 days.

This patent is subject to a terminal disclaimer.

(21) Appl. No.: 09/828,257

(22) Filed: Apr. 6, 2001

(65) Prior Publication Data

US 2001/0052000 A1 Dec. 13, 2001

Related U.S. Application Data (60) Provisional application No. 60/195,646, filed on Apr. 7, 2000.

(51) Int. Cl.
*G06F 15/16* (2006.01)
*G06F 15/167* (2006.01)

(52) U.S. Cl. ...................... 709/218; 709/231; 709/244; 709/201

(58) Field of Classification Search ................ 709/218, 709/232, 244, 200–204, 216–236; 719/310, 719/311, 319, 317, 328; 715/963; 717/161, 717/172; 718/102, 103, 100; 725/97
See application file for complete search history.

(56) References Cited

U.S. PATENT DOCUMENTS

| | | | | |
|---|---|---|---|---|
| 5,802,062 A * | 9/1998 | Gehani et al. | ............... | 370/465 |
| 5,823,879 A * | 10/1998 | Goldberg et al. | ............. | 463/42 |
| 5,881,245 A * | 3/1999 | Thompson | .................. | 709/219 |
| 6,036,601 A * | 3/2000 | Heckel | ......................... | 463/42 |
| 6,195,694 B1 * | 2/2001 | Chen et al. | .................. | 709/220 |
| 6,286,029 B1 * | 9/2001 | Delph | ......................... | 709/203 |
| 6,311,165 B1 * | 10/2001 | Coutts et al. | .................. | 705/21 |
| 6,446,045 B1 * | 9/2002 | Stone et al. | .................. | 705/26 |
| 6,477,707 B1 * | 11/2002 | King et al. | .................... | 725/97 |
| 6,494,363 B1 * | 12/2002 | Roger et al. | ................. | 235/379 |
| 6,502,076 B1 * | 12/2002 | Smith | .......................... | 705/14 |
| 6,514,140 B1 * | 2/2003 | Storch | ......................... | 463/25 |
| 6,519,693 B1 * | 2/2003 | Debey | ......................... | 712/201 |
| 6,714,545 B1 * | 3/2004 | Hugenberg et al. | ...... | 370/395.1 |
| 6,725,460 B1 * | 4/2004 | Nishiyama et al. | .......... | 725/32 |
| 6,876,974 B1 * | 4/2005 | Marsh et al. | .................. | 705/14 |
| 2001/0005855 A1 * | 6/2001 | Shaw et al. | .................. | 709/206 |
| 2001/0020236 A1 * | 9/2001 | Cannon | .......................... | 707/1 |
| 2001/0032122 A1 * | 10/2001 | Hankla | ........................ | 705/14 |
| 2001/0034643 A1 * | 10/2001 | Acres | .......................... | 705/14 |

(Continued)

*Primary Examiner*—John Follansbee
*Assistant Examiner*—Haresh Patel
(74) *Attorney, Agent, or Firm*—Buchanan, Ingersoll & Rooney (57) ABSTRACT

A system is disclosed for distributing and scheduling the play of advertising content utilizing a network. A database is provided for storing the advertising content. A server is coupled to the database. The server is capable of receiving and storing input preferences relating to parameters selected from the group consisting of: frequency, interval, time of play, and trigger events. A scheduling algorithm is executed on the server for generating scheduling data utilizing the input preferences. The scheduling algorithm is based on predetermined methods of processing these input preferences. A network is coupled between the database and the server for distributing the advertising content and the scheduling data to a plurality of output devices.

11 Claims, 9 Drawing Sheets

U.S. PATENT DOCUMENTS

| | | | |
|---|---|---|---|
| 2002/0019831 A1* | 2/2002 | Wade | 707/500 |
| 2002/0056121 A1* | 5/2002 | Ledbetter | 725/87 |
| 2002/0092017 A1* | 7/2002 | Klosterman et al. | 725/35 |
| 2002/0112925 A1* | 8/2002 | DiFranza et al. | 187/391 |
| 2003/0055729 A1* | 3/2003 | Bezos et al. | 705/14 |
| 2003/0080999 A1* | 5/2003 | Stone et al. | 345/751 |
| 2003/0103644 A1* | 6/2003 | Klayh | 382/100 |
| 2003/0200128 A1* | 10/2003 | Doherty | 705/8 |
| 2004/0064497 A1* | 4/2004 | Debey | 709/201 |
| 2004/0172655 A1* | 9/2004 | Nishiyama et al. | 725/97 |
| 2005/0283796 A1* | 12/2005 | Flickinger | 725/35 |

* cited by examiner

FIG. 1 Preferred Embodiment Configuration

FIG. 2

Fig 3 - AdPlayer Logical Diagram

MEDIACONTENT

Category: Production

| Orientation | Description | Dynamic | Duration | Expiration |
|---|---|---|---|---|
| Landscape | Bacardi Rum Ad | ○ | 10 | - |
| Landscape | Carnival Cash | ○ | 26 | - |
| Landscape | Club Paris French Stuff | ○ | 13 | - |
| Landscape | Club Paris Two Cards | ○ | 14 | - |
| Landscape | Cocabana Restaurant3 | ○ | 10 | - |
| Landscape | DefaultScreen Landscape | ● | 2 | - |
| Landscape | HLT Road Condition | ● | 5 | - |
| Landscape | HLT SouthShore | ○ | 12 | - |
| Landscape | Hotel Room Rate Ad | ● | 7 | - |
| Landscape | Paris CanCan | ○ | 25 | - |
| Landscape | Road Conditions | ● | 30 | - |
| Portrait | 5-Day Weather Forecast | ● | 12 | - |
| Portrait | Burger King Respect Ad | ○ | 36 | - |
| Portrait | Default Screen Portrait | ○ | 2 | - |
| Portrait | Gap Girl Portrait | ● | 15 | - |
| Portrait | Harrahs Tower of coins | ○ | 8 | - |
| Portrait | Jaguar Car Ad | ○ | 41 | - |
| Portrait | Technology Stock Quotes | ● | 10 | - |
| Portrait | Upgrade Room Spa Tower Player's Spa Ad | ○ | 15 | - |
| Portrait | You Are Watching Coolsign | ○ | 5 | - |

Double Click to Preview

Tree:
- Moe
  - Media Content
    - Production Content
    - For Approval
    - Rejected
  - Dynamic Data
    - Local
    - External
  - Default Display Group
    - Caesars3

Dynamic Content | Show Activity | Progress:
Server Online | Display Activity

SYSTEM FOR ELECTRONICALLY DISTRIBUTING, DISPLAYING AND CONTROLLING THE PLAY SCHEDULING OF ADVERTISING AND OTHER COMMUNICATIVE MEDIA

BACKGROUND OF INVENTION

CROSS REFERENCE TO RELATED APPLICATIONS

Reference is made to and priority claimed from U.S. Provisional Application Ser. No. 60/195,646, filed Apr., 7, 2000, entitled "Method and System for Distributing, Displaying and Controlling Advertising Electronically".

This application is related to U.S. patent application Ser. No. 09/828,463 filed concurrently with this application and entitled "Method and System for Electronically Distributing, Displaying and Controlling Advertising and Other Communicative Media," Such application is expressly incorporated herein by reference.

FIELD OF THE INVENTION

The present invention generally relates to media distribution, display and control systems, and more particularly to an improved system for scheduling and distributing content (i.e. audio, video, multimedia, etc.) and display/broadcast control data There are many different forms of advertising media present in public spaces such as malls, airports, hotels, casinos, etc. The primary types are printed sign stanchions, backlit transparency displays, L.E.D. message boards and video displays. Each of these forms have varying degrees of effectiveness, cost, and ease of changing the content presented.

Printed signs mounted in a frame on a stanchion, are inexpensive to place and can have full color artwork placed on them. They are reasonably effective at delivering a single message, but do not have the viewer attracting power of a moving display. The cost of setting up one of these displays is relatively inexpensive. In order to change the display, however, new artwork must be created, printed and physically replaced by someone. This is time consuming and costly in terms of an employee's time to accomplish this task. These displays are ubiquitous, and can be found in almost all public spaces.

Backlit transparency displays are more effective at attracting attention than are printed sign stanchions due to their large size and luminous nature. But, the fixture involved with these types of displays is significantly more expensive than a simple stanchion. The cost of the transparency itself, and the labor costs associated with the replacement of the transparencies is higher than that of sign stanchions as well. Despite higher costs, their increased effectiveness has made these displays very common in high traffic spaces like airports, hotels, arenas, malls, and convention centers.

Electronic message boards, consisting of an array of light emitting diodes (L.E.D.s), have been available for some time and have the advantage of presenting a moving display of messages or images. These type of displays also have the advantage that they can accept instructions to change the content displayed on them remotely, and without manual intervention at the point of display. Furthermore, a number of these devices can be controlled from a central location or single source. These devices cost significantly more than printed media, but have lower maintenance costs. These displays have a significant drawback however, in they have a very limited pixel resolution and are commonly able to present only one, two, or three colors, as opposed to the full range of colors used in print or video media. This limitation has restricted types of these displays to use in applications like airline flight information, stock tickers, display of sports scores or other news in bars, and display of progressive jackpots in casinos.

Video is the most popular advertising medium in use today, with broadcast television being its primary means of content presentation. In recent years retailers and the managers of public spaces have brought in video display systems for advertising use. Retailers use the displays to present their current offerings or sale information, while the public spaces sell time on the video display to advertisers either national or local, knowing that large numbers of consumers will see the presentation. Video is also one of the most effective mediums as a result of its eye catching full color, high-resolution, full motion capability. There are drawbacks to using video in advertising applications however; the production of video content is expensive, and the distribution of new video material to a display requires physical intervention. Even if a broadcast means were established, it would restrict all displays to presenting the same material simultaneously, and it would be very expensive. In a non-broadcast scenario, the addition of a single piece of new content to a presentation loop would require the reediting of the display master media. Lastly, it is not possible to vary the content, or even the sequencing of it, once deployed.

There is thus a need for a new type of advertising system which overcomes the above described deficiencies in the state of the art and which provides for a combination of remote as well as local control without manual intervention at the point of display.

SUMMARY OF THE INVENTION

A system is presented which provides for the distribution and display of a variety of visual and audio materials, and which includes a centralized content distribution network, supported by high-speed data links that allow for the deployment and control of the content displayed, or otherwise communicated or transmitted, on each of a plurality of individual display or transmission components connected to the network. The display components provide for the display of dynamic content as well. That is, content that is created, in whole or in part, on the fly, using specialized software modules or data streams originating from either a local source or a network source. The network described can be as large in scope as the connection of display components or sub-systems in a metropolitan area, statewide, nationally or even internationally.

An advertising system in accordance with the present invention is comprised of a plurality of display units, each capable of presenting multimedia, video and audio information. (As used herein, display units represent any type of output device capable of communicating via display, transmission, broadcast or other dissemination of any type of communicative message, information, graphic or photographic content, indicia, etc.) Each display unit is controlled by a display controller, which stores the majority of the media content to be displayed. The display controller and display unit (i.e. output device) may be characterized as a remote device. Content can be static, in that it is identical in its presentation each time it is presented to the display controller. Content can also be provided from a live source, of which the source material comes to the display controller via the network. Each display controller is connected to a high-speed data network, 100Base-T, ATM, or similarly capable system. Also connected to this network is a local network controller or server, which provides service to the several display controllers, as well as acting as a security gateway between the local network segment and a wide-area network. The security functions of the gateway are capable of supporting various levels of protection commensurate with the nature of wide area network connection, either direct intra-company connection, or public internet connection.

Unique advantages of this invention are that it allows a large network of advertising, and display or broadcast of communicative messages or images or any other kind of digital content to be created, it allows each of the displays to have unique content presented upon them, and it allows the content on each display to be changed, in whole or in part without manual intervention at the point of display.

A further advantage of the invention in that it allows for the introduction of dynamic content to be presented on the displays. That is, content that is created, in whole or in part, at the time of presentation, using specialized software modules or data streams originating from a local or network source or sources.

Yet another advantage of the invention is that full motion video, either from a stored or live network source, can be presented on the display, in concert with other multimedia content, either simultaneously in a shared display application, or in a full screen application, as controlled by either a central or a local control system.

Still another advantage of the present invention that in the event of a loss of network communication with the central control system, the display controller can continue to operate effectively, and may still receive control information from the local network controller and local control systems.

It is a further advantage of the system that the display controller maintains an exact log of each piece of content presented. This information is transmitted via the network to a central control system where it is stored in a database. Any other data logged by system controllers from external sources will also be uploaded to the central database. The central database of information may then be queried for a variety of purposes including client billing, statistical analysis, and performance monitoring.

DETAILED DESCRIPTION OF A PREFERRED EMBODIMENT

Generally stated, the present invention relates to a system for distributing, displaying and controlling content, such as advertising, electronically. A feature thereof is a scheduling algorithm which has massive implications for many applications that are currently on the Internet. The original design of this algorithm has to do with the provision of music content on the Internet but it applies as well to advertising, a display of images or any kind of digital content, in terms of scheduling and playback. It has a wide class of applications. Another feature of the present invention has to do with the monitoring and changing of electronic advertising via the World Wide Web so as to provide a real world advertising system that is capable of displaying advertising in public places and to enable advertising customers to monitor and change advertising content via a web interface. Yet, another aspect of the present invention relates to the provision of a method of selling electronic advertising. The advertising need not be limited to public space displays and can include broadcast advertising, or any other form of advertising applicable to any digital electronic advertising system. This aspect also relates to the sale of advertising time at auction with the winner of the auction having its ads executed immediately. The present system may include an auction that allows an advertiser to purchase the right to advertise at a particular time. For example, he might enter the auction and indicate that he would like to buy a particular time slot on a particular site and then bid on it. The ad materials would already be prepared such that the auction can close mere moments before the time scheduled for the advertising to play. The process is fully automated such that the winner of the auction has its advertisement played and he is automatically billed. It requires no manual intervention and the bid winner's advertisement immediately follows a successful bid.

Still another feature of the present invention relates to the integration of data streams from corporation information, Internet data or other data sources into advertising both as to the content and the scheduling of advertisement play rather than having to constantly re-author electronic media to reflect changing business and retail situations. The advertising system can actually take the data in live and readjust the media that is being played to reflect the current situation in real time. This provides a much more up-to-date advertising capability. An example of this updating feature is where one has a catalog, for instance, that has both pictures and prices. The present invention can seamlessly integrate both the pictures and the prices such that when an item goes on sale, it will promote that sale using the old pictures but the new sale price, and automatically bring this information to the screen by virtue of a trigger that indicates that the item is on sale. Thus, some routine intervention in the database, be it a corporate skewed database even like in a supermarket where oatmeal is now on sale, this system would in effect say "now I know which items are on sale so I am going to scan through the store inventory and determine that the oatmeal is on sale and automatically advertise the oatmeal". If pictures are available it can use them; otherwise the pictures could be made available independently.

Still another feature of the present invention is the ability to coordinate real world advertising—advertising that has been shown on conventional media, or even new media, like television or electronic posters or billboards, or anything of that type—and have such advertising be synchronized with virtual or web based advertising where the advertisements that are shown in the real world can automatically be transformed and prepared for Internet use and vice versa. One can have an Internet ad that can be bridged to a real world advertising venue and handled in an automatic fashion such that a lot of human intervention is not required.

Figure 1:
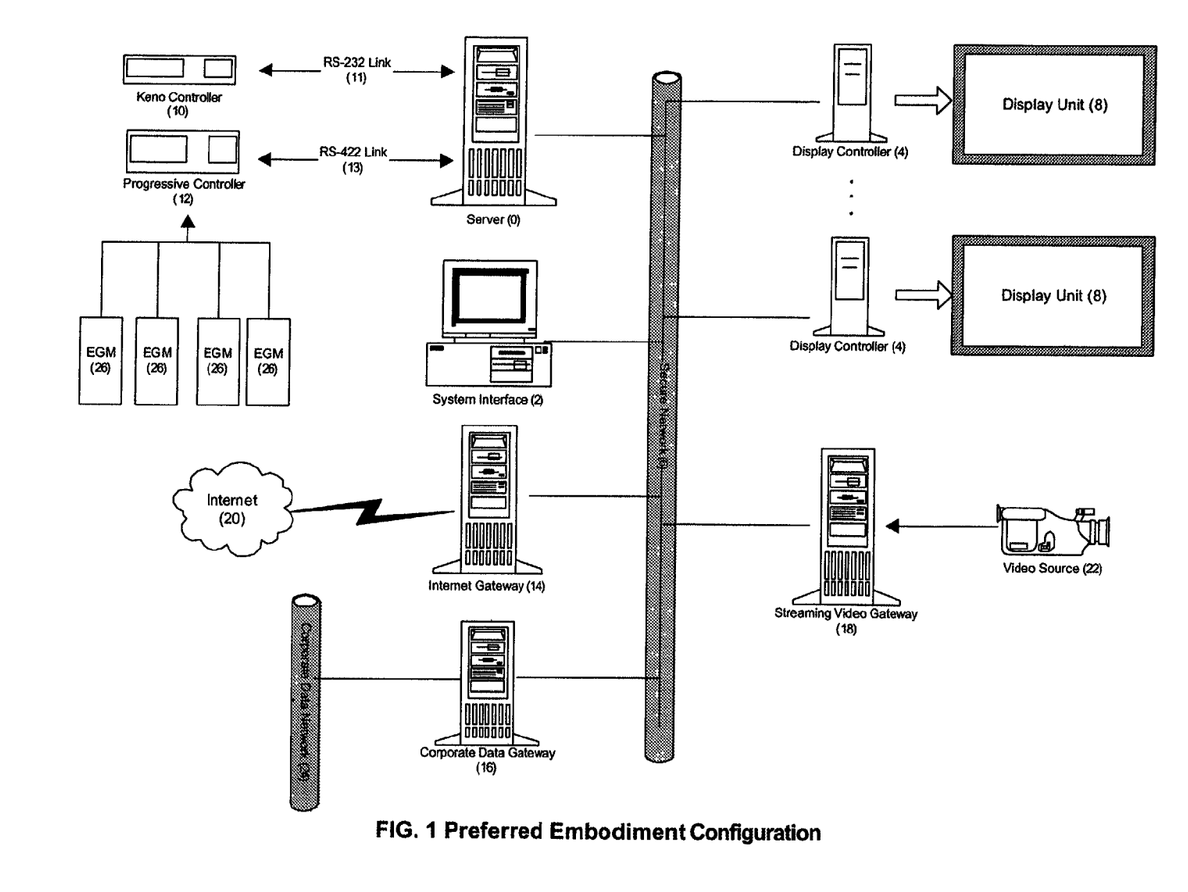
FIG. 1 is a block diagram schematically illustrating the architecture of the present invention.

Referring now to FIG. 1, the preferred embodiment of this system allows an operator to direct the advertising on a network of many display controllers (such as advertising signs). The display controllers can be either connected directly on a 10 base T or 100 base T network or remotely via a dial-up, ISDN, XDSL or other type of link. Collectively, these connections are called the secured network as all transmissions are verified through the security software contained in the network interface that receives and transmits the information on the devices. A set of signs is controlled by one server that the operator accesses through the system interface. (As used herein, display units represent any type of output device capable of communicating via display, transmission, broadcast or other dissemination of any type of communicative message, information, graphic or photographic content, indicia, etc.)

In the preferred embodiment, there is a hierarchy of servers, each of which can control a network of signs. With the servers having control and information channels directly to each other via the secure network. Having this hierarchy provides a way for the operator to control the entire network of signs at and below the level they access the secured network using the System Interface.

The system contains a minimum of five major parts: a server (0), system interface, (2) display controller (4), secure network (6), and a display unit (8). The system is designed to work at three distinct layers. Each component is be designed so that the same code can be run at any layer, and only changes in the configuration are required to get each component to function correctly. An example of a typical configuration of the system installed in a casino will also include connections to the following controllers: Keno Controller (10), Progressive Controller (12). The preferred embodiment also contains three additional gateways that plug into the system an internet gateway (14), a corporate data gateway, (16) streaming video Gateway (18).

The Secure Network (6) provides the communication between all the system components. To start the secure communication, each component obtains a secure 'key' that is used to unlock the TCP/IP packets that come across the network for it. This system makes sure that only registered components receive or transmit information on the network. It also validates control or change information as only approved users can get in to use the system in the first place via the user validation mentioned above.

For some of the applications of the system it is necessary to acquire real-time or real-world data to complete the information being presented. In these cases, the Internet gateway (14) is used to find specific information on the Internet (20) and format it for use by the system. For example, if an ad, or other type of content, needs to display, or otherwise communicate, the current temperature, the Internet can be queried to find this information much easier than installing and maintaining the sensors necessary to get this information. Internally, the gateway uses a highly configurable Internet data extractor (90) program that is able to find information from specific websites. The access to the Internet and then to the secured network (6) is done through the same network interface layer (42) (discussed as part of the display controller (4) in the discussion of FIG. 2) as that used in the rest of the system. This mechanism provides the Internet gateway with the means to provide the unsecured data from the Internet to the secured environment of the system.

Some of the information displayed on the system can depend on information present in corporate databases. The corporate data gateway (16) is used to access this external information. For example, if we want to key the advertisements of clothing so that the ones with the highest inventory are shown more, the corporate database can be queried to find out the relative inventory levels. If it is found that the inventory level is high for an item, the frequency of ads for that item can be increased, and thus provide for more sales of the merchandise. This type of application requires the corporate data gateway. Internally, the gateway contains a corporate data extractor that can query information on corporate databases via the corporate data network (24). It then takes this information and changes it into secured information that the Server (0) can use via the network interface (42).

In some cases, live events will be shown on the sign network. By using the streaming video gateway, this live content can be channeled to any sign on the network that is set up to receive this type of transmission from any video source (22). This makes it possible to show important breaking news or a special entertainment or advertising event without having to have the content already present on the display controller, as is the case with other media.

If the sign system is installed in a casino environment, it is often the case that a progressive controller (12) will be hooked into the system. In this configuration, the progressive controller has a number of electronic gaming machines (EGMs) attached to its input ports. The controller, in turn, is hooked up via an RS-422 link (13) to the Server. Through this link, the information about the current jackpot totals for the top seven levels of the progressive is loaded into the server's dynamic data repository (54). Information about jackpot hits and their amounts are also sent over the serial line to the receiver. The communication software translates these values into dynamic data variables. Using the existing dynamic data method, the values are 'published' once they are obtained from the controller so they are available to the rest of the network. This method works whether the controller is hooked up directly to the server or a display controller.

Similar to the setup of a progressive controller, a keno controller (10) can also be hooked up to the system via an RS-232 link (11) to either the Server or a Display Controller. In the case of the keno controller, the values that come over the link are the current game's numbers as they are determined as well as past games' IDs and results. These values are published as special keno variables in the dynamic data area of the system to be used by the displays as appropriate. (Both the progressive controller and the keno controller may be characterized as gaming devices.)

Figure 2:
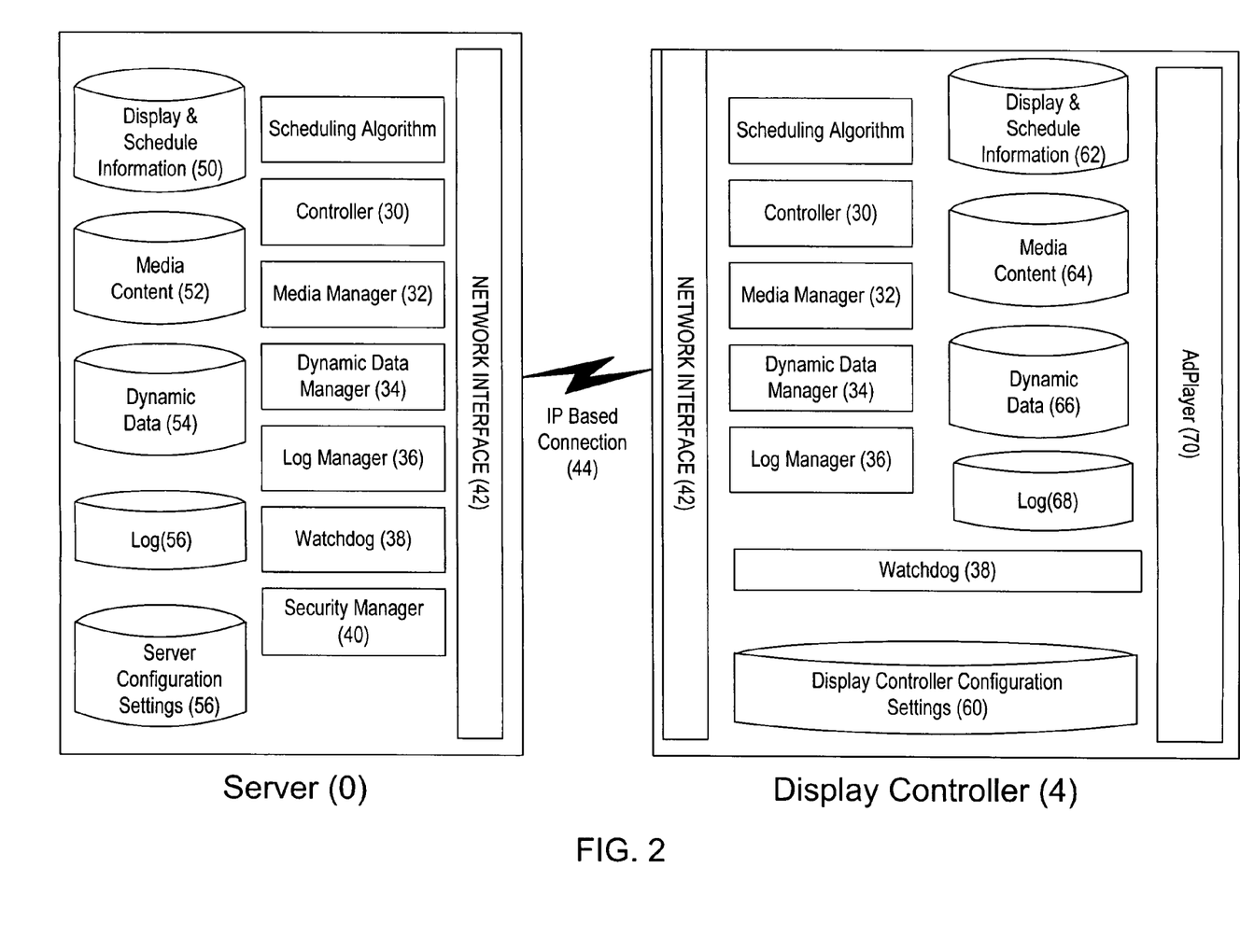
FIGS. 2 and 3 illustrate alternative organizational structures for system data.

Referring now to FIG. 2, each part in the accompanying diagram is described along with its relationship to the other components. A description of the logic that each component uses to govern its action is also given to bring about a full picture of the system's workings. The server (0) is the central communication point for the network of display controllers. All control and communication with the system is done through the server (or hierarchy of servers) using the secured network. When updated with the system interface, all of these components are sent to the display controllers via the secured network. Within the server are several components that work together to complete the server's tasks, they are the controller (30), media manager (32), dynamic data manager (34), log manager (36), watchdog (38), security Manager (40) and network Interface (42).

The server is also the central repository of information about the sign network that it controls. Each of the above components controls its own database for the information that it handles. These are marked in the, display & schedule information (50), media content (52), dynamic data (54) and logs (56). Together, the databases contain the aggregate set of media, schedules, data, logs, relationships, and constraints that are used in the set of display controllers on the secure network. Each of the software components in the system are designed to run at any level within the network. Thus, the server runs the same media, schedule, dynamic data, and log managers as are running on a display controller. The differentiating factor is the configuration settings database (58) that indicate to the managers the role they play. The configuration settings also contain the data that the security manager uses to manage the set of users of the system.

Communication between the above managers are all done via TCP/IP and thus makes it possible to have a component running on a different machine if that is necessary to make the system run smoother, thus providing a load-balancing mechanism.

The display controller (30) is the main point of contact for the system components running on a server or display. That is, when the various displays and servers setup their communication with one another they first connect to the controller. From that connection, they will learn the port numbers for the other managers that are used for the other connections in the system. As mentioned above, the controller software is the same at all levels of the network hierarchy. The configuration settings on the local computer indicate where it resides in the topology and thus allows the software to configure itself appropriately to make the right connections to other machines in the network. This is particularly important to the controller, as it is the initiator of the connections in the system.

The site controller is responsible for the displays. For all the displays that are connected to the site controller, it organizes and maintains their schedule and grouping information. As mentioned above, a hierarchy of servers can be constructed by connecting together the controllers on each server. This topology is used by the interface to determine what control services are available to the user when they plug into a level. For example, if they use the site interface, they can perform schedule edits and other operations on all the displays in the site. However, by connecting up to the Network level, the interface can affect all the displays in the network. The display grouping, schedules and other features of the interface are available for each of the servers that it can affect.

As the manager of all the displays, the controller is constantly monitoring the health of each of the display connections it maintains. If a display disconnects for any reason that information is logged for later review. The controller also is available for new display connections. When a display does connect, the controller must determine if this is a display that has previously been connected. If so, the stored information about that display is used. That is, if the display has the same name as a previous (and unconnected) display, it copies up the current status information about that display: the schedule, the current set of logs, and the set of variables to which it is subscribed. If the previously recognized display connects up, but does not contain this information, it is assumed to be a replacement machine for that display. In this case, the server copies down to the display the status information as well as the content and data required to run its schedule. If a new, unknown display connects up to the controller, it creates a new entry in its default display group database. It then copies up any existing status information from the display and commences display management procedures for it.

When a display hooks up to the server, its content and software is checked against the master copy kept on the server. This process verifies the integrity of the code and data on the display controller to be sure that it is 'legal', or known to the server. It must also match the current version of the data on the server. For example, if the user updates an ad, the server must make sure that all the display controllers that use that ad are then updated so they hold the latest version. This is also true for schedules, dynamic data and the logs. To make this job possible, each piece of data holds its own signature that is held in a database by the server. The server then can query other devices in the system to determine what signatures they hold for their data. If there is a mismatch, the server initiates the replacement of that data with the correct version. Once all the data has reached its destination, the device cuts over to that new data and deletes the old version.

Schedules are a set of constraints that indicate how ads are to be played on a display controller. Using the System Interface, the operator can draw upon the list of approved content to create a new scheduling item. The schedule item can contain one or more pieces of content. Once the content is selected, the constraints can be specified. The completed constraints are held in the Schedules database (52).

There are four main ways to set constraints on a schedule item. A fifth way involves what is referred to as "Category Filtering". First, the item can be set to play within the entire group of other schedule items randomly. A frequency of play can be assigned to the schedule item to indicate the weight that it should have relative to the other schedule items in the random selection algorithm. Second, the item can be set to play in a set sequence relative to the other items in the schedule, that is, each item always plays in order relative to its other schedule members. Third, the item can be played periodically; that is, every 'n' minutes, the ad is set in the immediate queue to play. The item can then be set to play after the current item, or to interrupt the current item to play the periodic one. (In these first three cases, the user can additionally set up a weekly calendar of hours that the ad should play.) Fourth, the item can be set to play at specific times during the day. For example at 12:00 pm, 4:00 pm, 4:15 pm, etc. The user can select what days of the week this set of times should be used to play this ad. Again, the item can be set to interrupt or play after the current item.

If the scheduled item is actually comprised of a set of content selections (i.e. a group of content), the user has additional options on how the schedule item is handled. When a grouped item is selected for play using any of the above mechanisms, the group can be played in four different ways. First, it can be set to play all the group items in order before moving on to the next schedule item. Second, the group can play all items randomly before moving on. Third, one group item can be played in order (relative to the last access of this group) before moving on. Fourth, one group item can be selected randomly to play before moving on to another schedule item to play.

Using the system interface, scheduling can be done at any level: the individual display, a group of displays, all displays at a site, or any number of displays in the network. There are two ways the system interface provides to organize display controllers to make scheduling easier. First, you can group together displays that have like characteristics that make sense to the site. For example, all display controllers in the food court could be in one group. A display controller can be a member of more than one group to make scheduling easier. Second, the time on the display controller can be broken up into segments. Each segment is known as a 'virtual display' and can be scheduled just like a real display. This is particularly useful when more than one entity has control over the content on the display controller. For example, if the operator controls 50% of the time on the display controller and the provider of the display controller controls the other 50%.

The Media Manager (32), media is used to manage the audio, video and still frame assets that are needed for displaying the output on the display controllers. Each complete set of media and ad control information that makes one ad is placed in its own folder and is called 'content'. The server is designed to import and store content in four different categories: Production, For Approval, Rejected, and Archive. All media is stored in the media content database (52). Media is initially placed in the 'for approval' category when it enters the system. There are two ways this can be done; First, the user can copy the content folder directly to the 'for approval' input area where it is then imported by the system. Second, they can create content using the Content Wizard. This is a tool that works within the system interface and provides the user with a step by step method for importing still frames or movies and turning them into valid content. The user of the system can preview the content and then make a decision about whether to approve the content or not. Approved content is 'signed and sealed' into an approved container and put into the 'production' category. Otherwise, the media is put into the 'rejected' category. Media that is deleted from any other category is placed into the 'archive' category where it can be subsequently removed. Note that the Security Manager (40) handles the privileges that are required to operate the system at this level. This is to prevent unauthorized persons from getting data into the display system and potentially creating a bad situation for the sign operator (e.g. visual graffiti).

By using the dynamic data manager, the user of the system can change the way an ad appears when it is rendered by the AdPlayer (70). For example, if you set up a dynamic variable to contain the text for today's sale, the ad that features today's sale can take that text and insert it into the ad when it plays. The server manages all the dynamic data for its network and provides the means to add, edit and delete the data through the system interface. Data can be of a boolean, number, text, database or picture value.

Because the system is managed remotely, it is important that aspects of the operation of the system are logged. This is accomplished by the log manager function (36). What this means is that everything that happens on the server, display controllers, and other system components can be queried with its status uploaded to the server on demand. The logs contain startup and shutdown times, software version numbers, data transfer events, errors, and ad play information. It is this last category that is of particular interest to the system as a whole because it provides the means by which the proof of playback is done, and therefore makes it possible for the company to bill for the ads played. Some log entries are flagged as immediate service issues. This type of log entry causes the system to initiate an 'alert' mechanism to bring service technicians to the spot of the problem. First, the log manager identifies the message as an 'alert' log entry. Then, it follows the escalation process that is assigned to messages of that alert level. The alert could take the form of a special log entry, a network alert (i.e. sent to the top server on the system), or an email or pager alert that is sent directly to a service technician to be handled.

In order to make sure that all parts of the system are running continuously, it is preferable to have one more program that can restart a component if it fails. When the watchdog (38) detects that one of the programs in the system is no longer functioning properly, it kills the program and restarts it. The watchdog is designed, to allow it to have both software and hardware components. With the hardware addition, if the watchdog itself or the machine on which it runs becomes inoperable, the hardware resets the entire machine to restart the system. The watchdog is designed to be configurable as to the types of elements that it removes from the system. Besides killing and restarting programs, it also provides the mechanism to kill error dialog windows, load and run arbitrary programs, reboot the system, update software, and update the content.

The security manager (40) allows for the authentication of the users of the system and their actions, the security manager (40) handles the log-in procedure when the system interface starts up. After their validation, each user is assigned a set of permissions that indicate the types of actions they can perform in the system. These settings allow or prevent the user from doing the following activities: Initiate system maintenance commands change schedules, approve content or edit dynamic data, view logging information, make changes such as rename or delete to the displays or change display group membership. In the case when a user does not have access to a function, it does not even show up as an available option in their system interface.

The network interface (42) is the physical network interface configuration. The preferred embodiment is a high-speed Ethernet network, but other types of physical networks can be used such as ATM, Token Ring, etc. The only requirement of the transport mechanism is that it supports an IP based connection (44).

Figure 3:
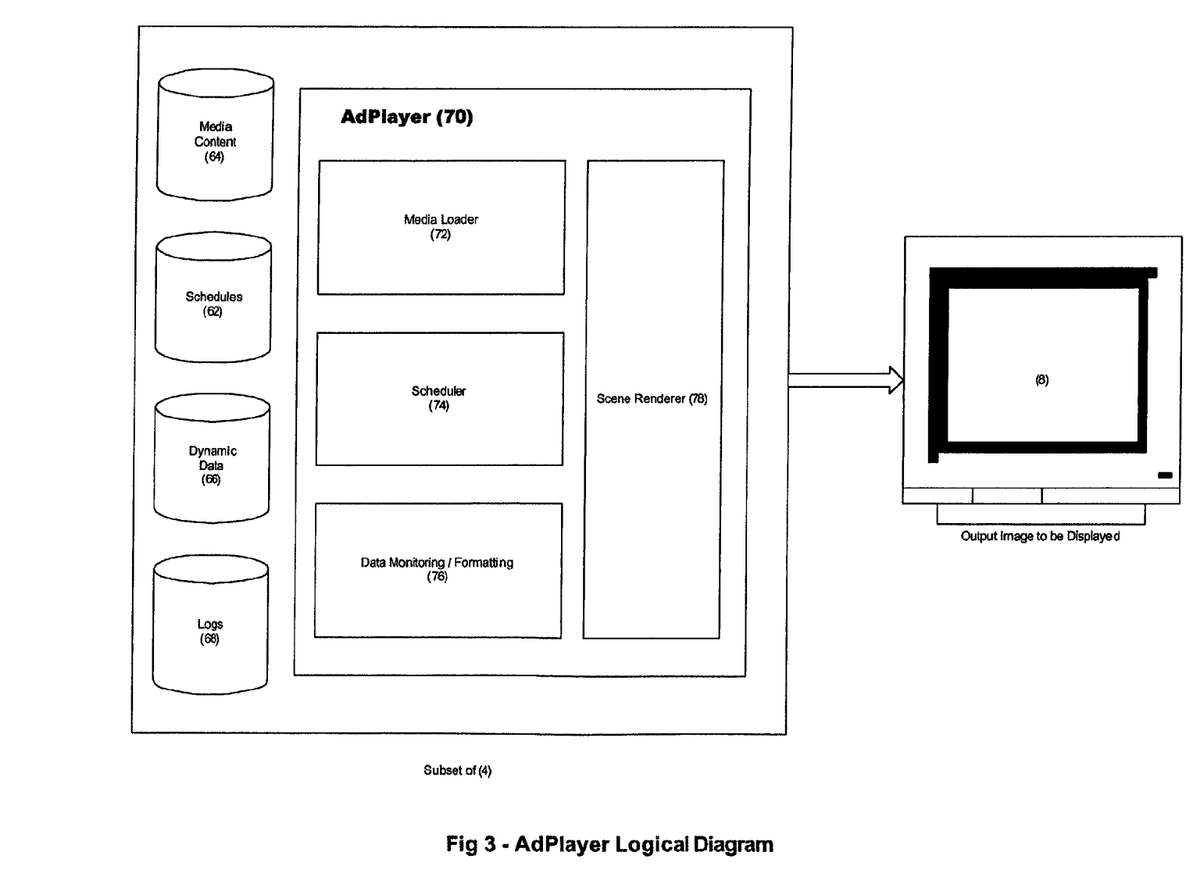

The display controller (4) is the set of software that runs on the computer hooked up to the display unit (typically a plasma screen). The following components in this software suite mirror those on the server (0): controller (30), media manager (32), dynamic data manager (34), log manager (36), watchdog (38) and network interface (42). The difference being that the software on the controller is has a set of configuration settings (60) that indicate that each manager is to operate as a display controller rather than a server. Also the storage for the above managers is different, only requiring the storage of the data necessary for the one display controller. These storages are labeled; display and schedule information (62), media content (64), dynamic data (66) and logs (68). The largest change is the presence of the AdPlayer (70) software that determines the ads to play given the constraints in the schedule and renders them to the screen. (The AdPlayer is merely representative of software that can communicate or otherwise transmit various forms of content, such as multimedia, broadcast, etc.) Referring now to FIG. 3, the job of the AdPlayer is to combine the display controller's schedule with the content and dynamic data to produce the display of ads that meets all the constraints. To allow for the quick display of ads, the media loader (72) preloads all the necessary data into memory so that it can be shown on demand. The media loader also monitors input from the server to determine if content needs to be reloaded or ejected to meet new scheduling needs. The scheduler (74) is the main logical portion of the AdPlayer. The scheduler follows its internal algorithm (detailed in another patent) to determine what ad to play next. When the next ad is determined is passed off the information to the scene renderer (78).

The data monitor (78) is in charge of accessing and formatting any dynamic data necessary for the display of the ad. A control file for the ad specifies what assets are driven by data. The data monitor finds these data elements and passes them on to the scene renderer (78). After the above components have done their job, the remaining task is to render the ad for display, this is handled by the scene renderer function (78). By accessing the data made available by the media loader, and the data provided by the data monitor, and referencing the information in the control file, the scene renderer draws the dynamic ad on the screen.

Referring back to FIG. 1, the system interface (2) provides the means to manipulate the content, schedules, data and other control information contained in the system. The interface is designed to communicate with any layer within the hierarchy of display controllers. That is, you can 'plug into' a display controller and get and set information about that display's schedule, or you can plug into the site controller to control schedules for all the displays at the site. You can move up the chain of servers as needed to get the desired level of control. Since each user of the system manager will be authenticated, the system interface can activate or deactivate sections of its user interface to only allow the permitted functions to be accessed. The system interface works by connecting to the appropriate manager for whatever activity the user currently performing. For example, if they want to see a listing of all the available content, the system interface accesses the display controller (4) via the secured network (6) and asks for a list of the content that it then shows on an interface screen. In this way, any function of the server or display controller mentioned in this document can be utilized by the system interface. Thus, the system interface itself is really just a client of the other managers and can only display the results or contents of those managers' actions and processes.

Figure 4:
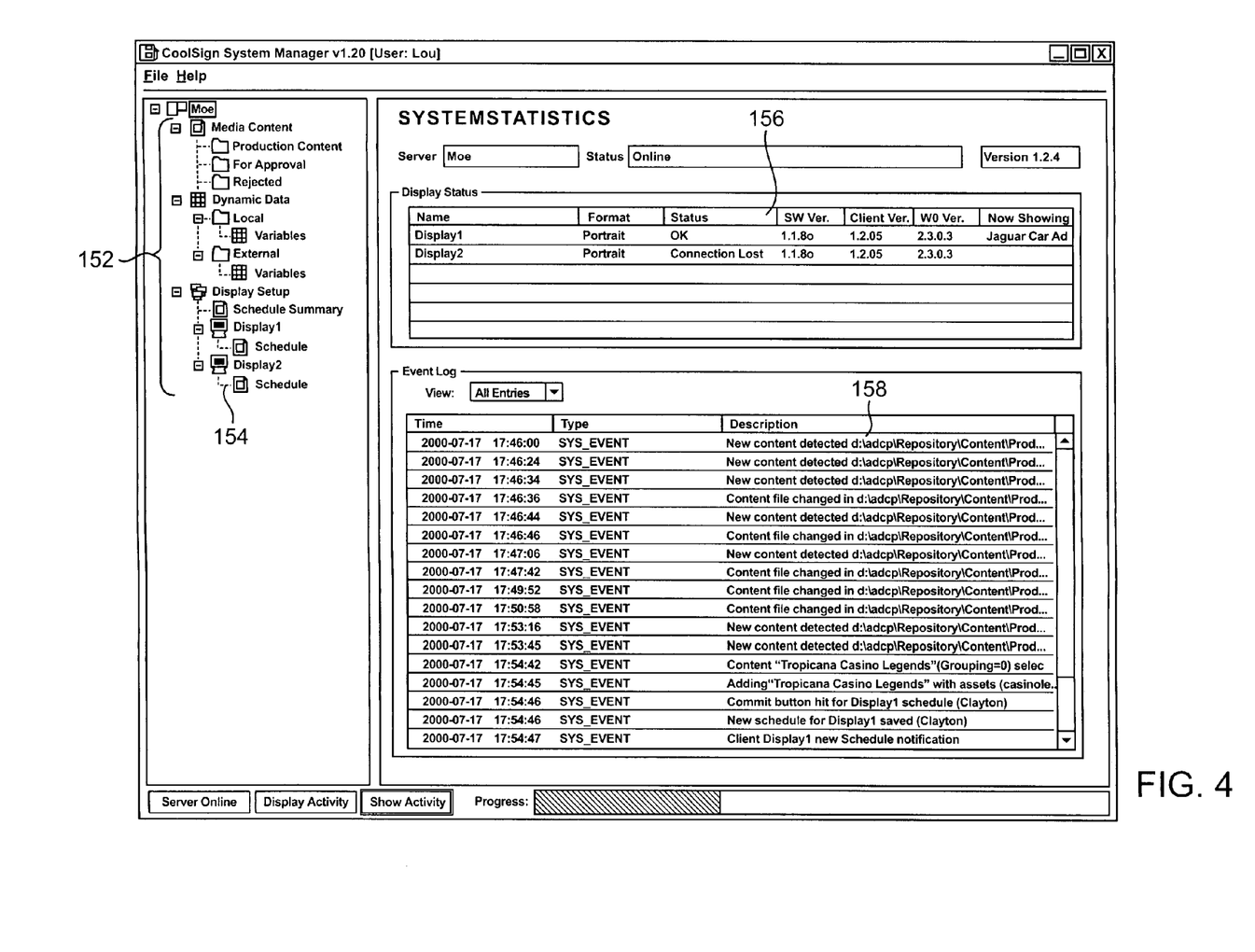
FIGS. 4 through 9 are diagrams illustrating operation of the preferred embodiment.
Figure 5:
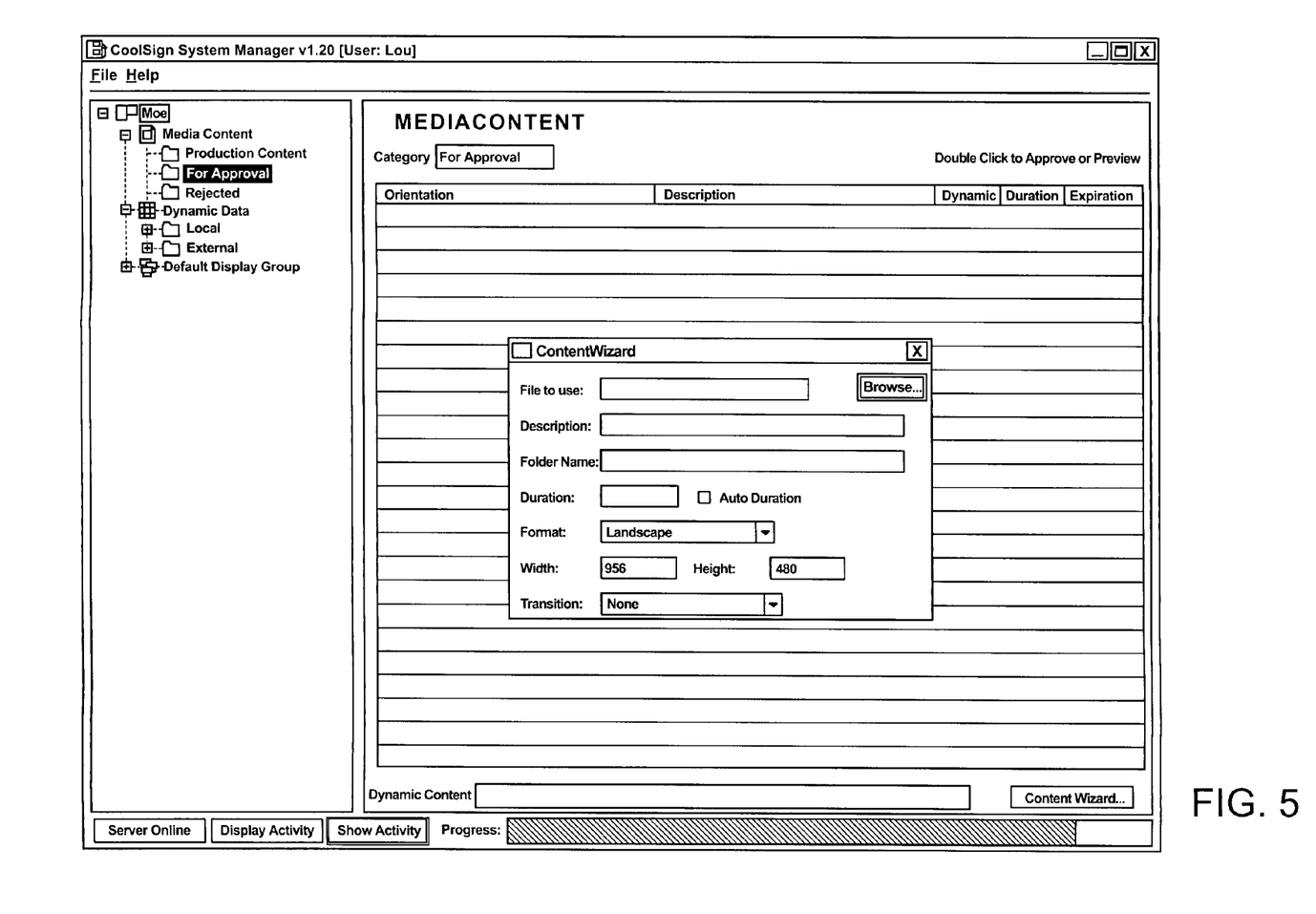

Now Referring to FIG. 4, the diagram shows the system statistics page (150) we see how the user can navigate among the sections that control the various datatypes presented above (152) using the navigation tree found on the left side of the interface screen. In the diagram we see a section to work with the Media Content that interfaces with the Media Manager (32). Next is the Dynamic Data area that allows for control of local and external variables through the Dynamic data Manager (34). And lastly, we have the section that allows the user to manipulate displays and their schedules (154) through the system controller (30).

The right-top part of the screen shows the area that displays the list of display controllers along with their current configuration information (156). This allows the operator to see that all their machines are running the right version of the software and that each one is either OK or showing some other status (e.g. Connection Lost). When display controllers are running, the currently showing ad name is displayed as well. On the bottom right part of the screen, we see a display of the system log entries (56) from the server (158). This is the output from the Log Manager (36) running on the server.

Figure 6:
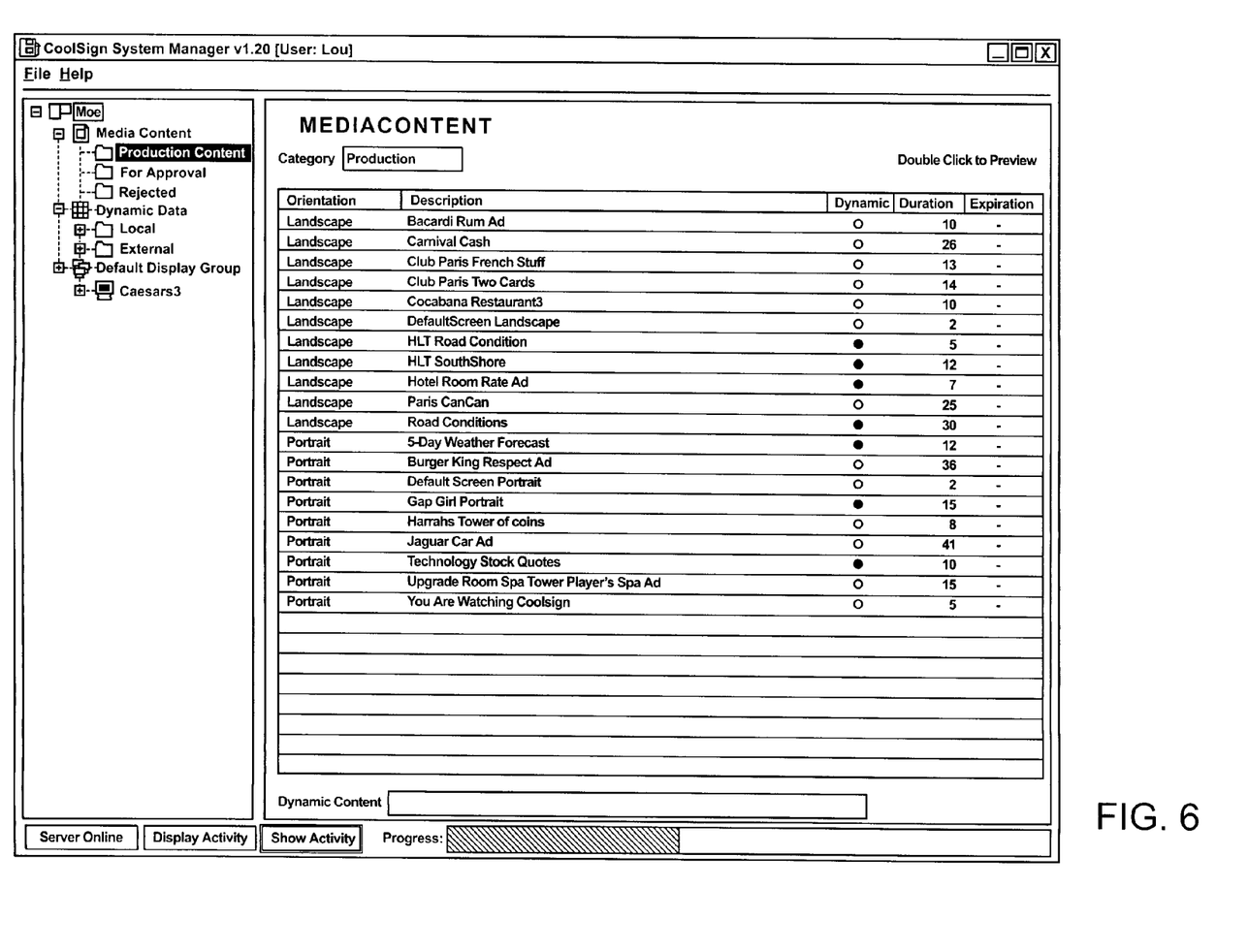
Figure 7:
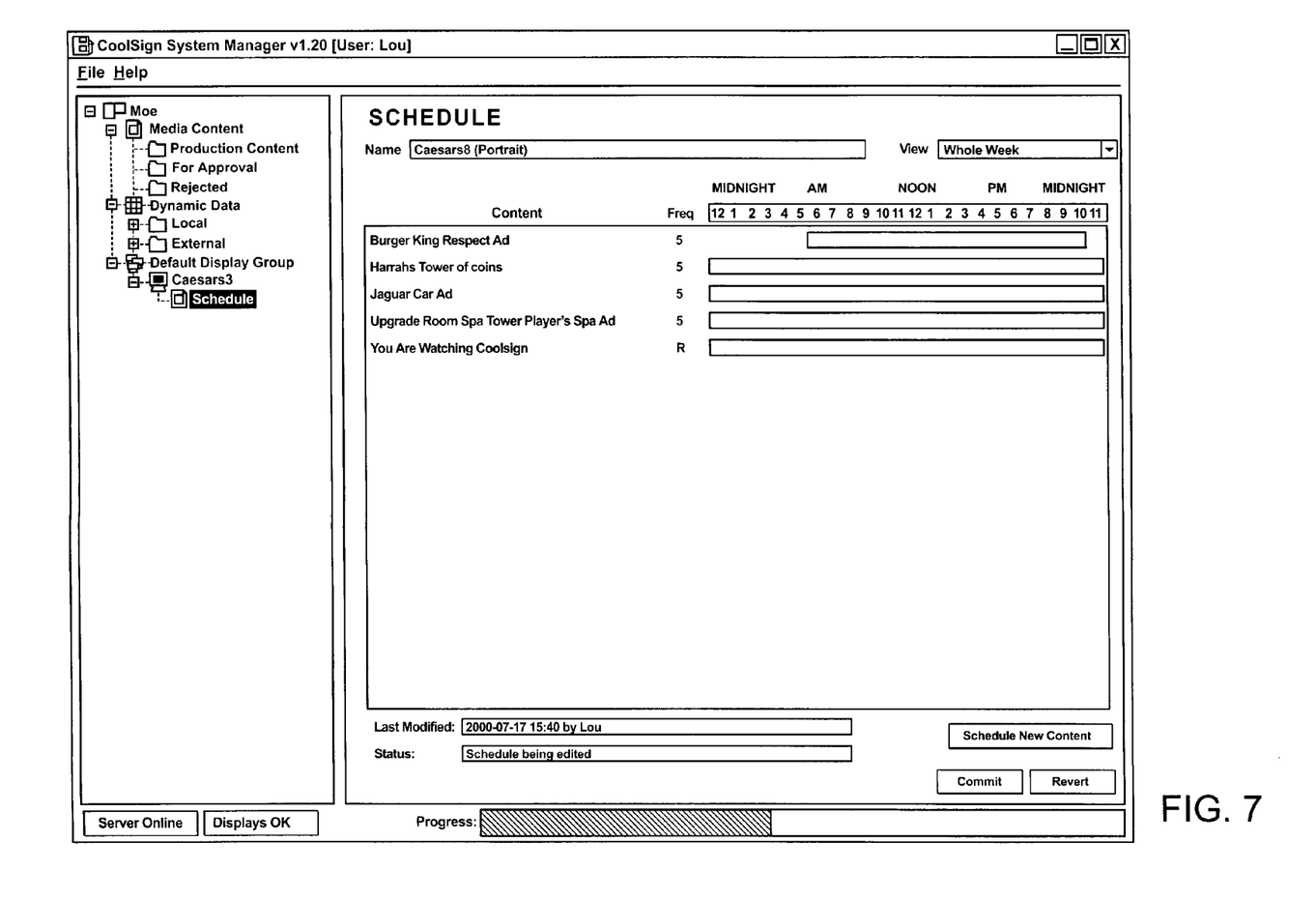

Moving to FIG. 6, the Media Content diagram shows the content wizard in use. This tool is used to import standard graphics and movies into the format that the system can display. From this dialog, the user can browse for the file to import, give it description to use for its name when displayed in the system. The user can also specify a transition to use in-between display of the media. The imported content goes into the 'For Approval' area (the screen that we see in the diagram) from which the operator can approve or reject the content. Approved content moves into the production area of the media content section as shown in FIG. 7. Here we see the list of approve content sorted by its format (shown as orientation in the diagram). Generically, there are many formats supported by the system, but the primary formats are the portrait and landscape orientation formats for the large plasma display devices in use.

The Schedule diagram FIG. 7, shows how the schedule is represented to the user. Here we see the daily schedule for each piece of content currently scheduled on the Caesars3 display controller (see 'Name' at the top of the screen). In this example, each piece of media is supposed to run all day, except for the first item, "Burger King Respect Ad" which is supposed to play just between 6:00 am and 11:00 pm.

Figure 8:
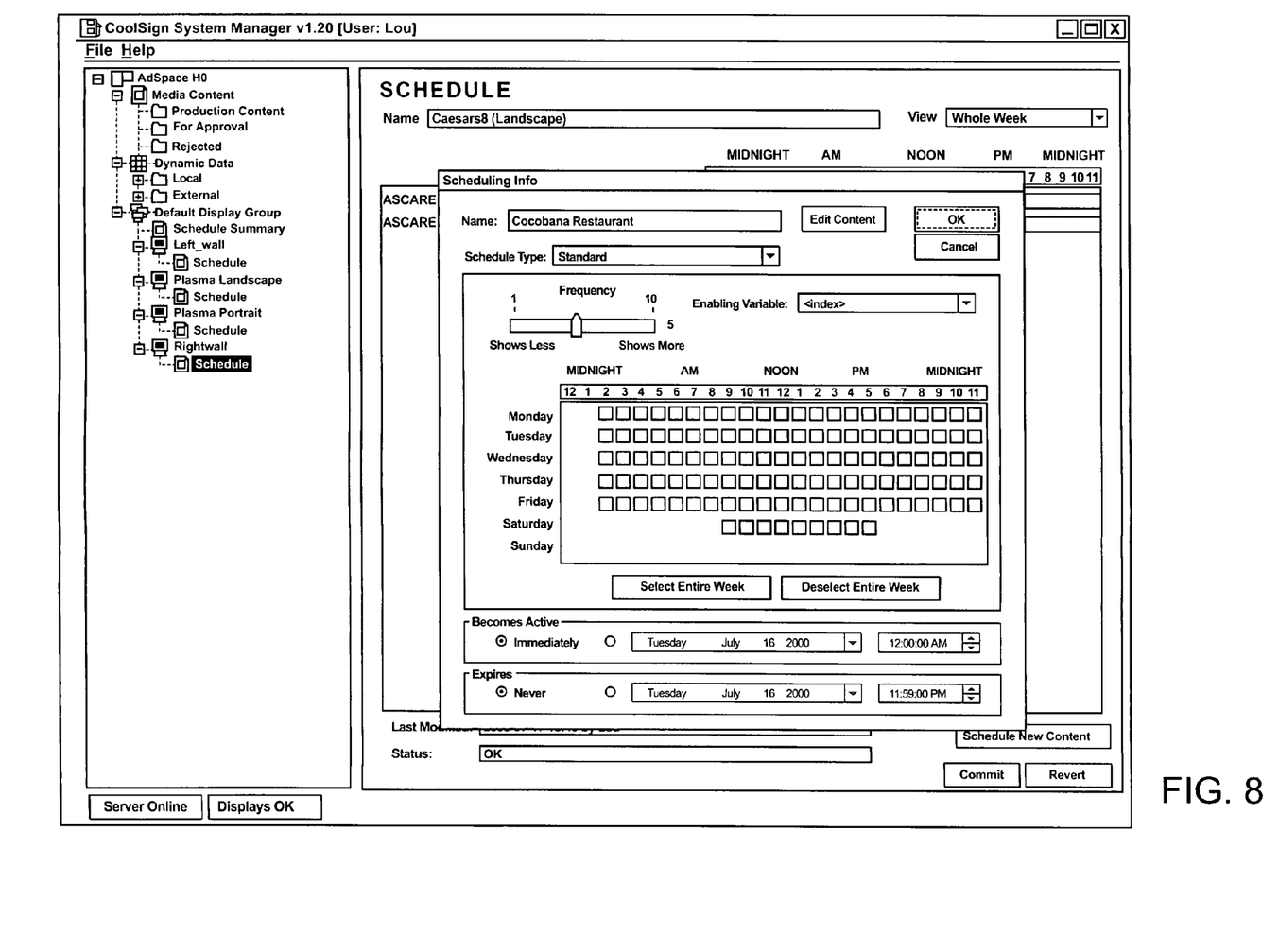

Moving now to FIG. 8, we show how each ad is scheduled on a weekly basis and also where its scheduling type is determined. In this example, we see that this media is being schedule for most of the week, except for between 12:00 am and 2:00 am every day, not at all on Sunday and only between 9:00 am and 6:00 pm on Saturday. This item is also scheduled as a 'Standard' schedule type with a frequency of 5, which means that it will play as often as other frequency 5 items, but less than higher frequency ones. Also note that this media can have an activation and expiration date (bottom of the dialog) to make the scheduling more flexible. Please refer to the earlier section in this document and our other patent document for a complete description of the scheduling options and algorithms.

Figure 9:
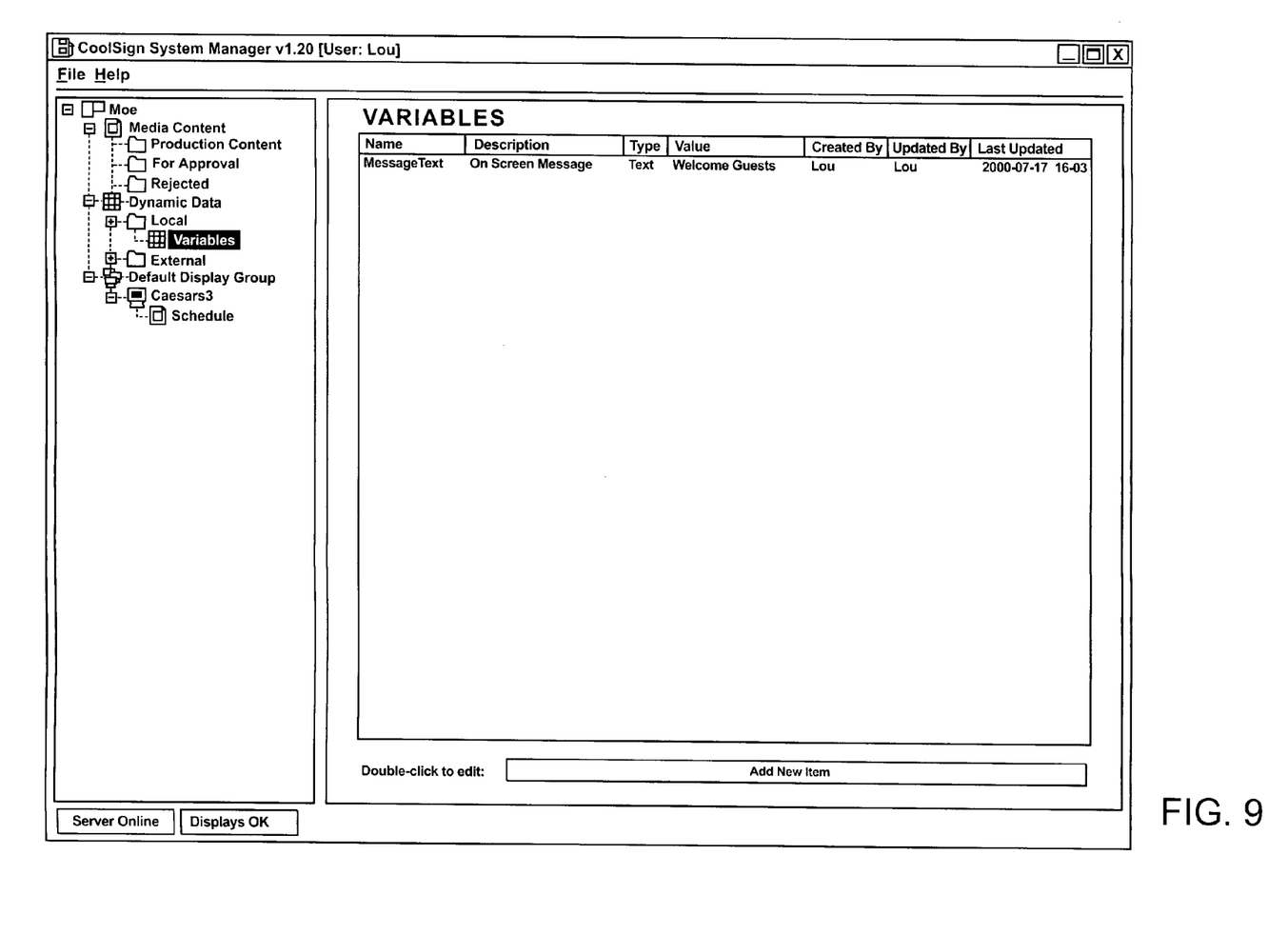

When accessing dynamic data, the operator would use the 'Variables' screen as shown in FIG. 9. Here we see all the 'Local' variables that are being managed by the dynamic data manager (34). The user can select the variable and change its value if they have the right permission in the system.

It will thus be appreciated that the present invention provides a system for facilitating the electronic scheduling of content playback at one or a plurality of sites or venues playing and or broadcasting any of a variety of types of media. As described above, discrete items of content (either audio or video, or both audio and video) may be scheduled for playback based upon a schedule created by the integration of at least five standard scheduling methods included within a single comprehensive scheduling algorithm.

While the above provides a full and complete disclosure of a preferred embodiment of the invention, various modifications, alternate constructions and equivalents may be employed without departing from the true spirit and scope of the invention. Accordingly, it is intended that the above not be construed as limiting the scope of the invention, which is defined by the appended claims.

What is claimed is:

1. A system to schedule a distribution and play of advertising content on remote display devices utilizing a network, comprising:
 (a) a database for storing the advertising content;
 (b) a server coupled to the database, the server being capable of receiving input preferences relating to play of scheduling parameters including frequency, interval, time of play, trigger events, and category filtering, said server including a set of specialized software components adapted to work with each other to complete the server's tasks;
 (c) a plurality of remote display devices to dynamically display the advertising content:
 (d) a scheduling algorithm executed on the server to generate scheduling data utilizing the input preferences, the scheduling algorithm being based on predetermined methods of processing the input preferences in order to vary the advertising content after the advertising content is deployed for each of the plurality of display devices individually;
 (e) a centralized network supported by high speed data links to distribute the advertising content and the scheduling data to the plurality of remote display devices, said scheduling data indicating when and how often the advertising content is to be displayed in each of the plurality of remote display devices individually without restricting all the display devices to present the advertising content simultaneously; and
 (f) at least one remote communicative device coupled to the network to receive and respond to the scheduling data to communicate the advertising content to at least one of the plurality of remote display devices, said remote communicative device including a set of specialized software components that mirror said set of software components and said scheduling algorithm, said remote communicative device being capable of storing the advertising content and scheduling data so that said remote communicative device can continue to function in the event of a loss of network communication with the server.

2. The system recited in claim 1, wherein said remote communicative device includes at least one remote server, and at least some of said plurality of remote display devices that are coupled to the network via the remote server, the remote server being capable of distributing the advertising content to the at least some of said plurality of remote display devices for display in accordance with the scheduling data.

3. The system recited in claim 2 wherein the remote server provides security between the at least some of said plurality of remote display devices and the network.

4. The system recited in claim 1, and further comprising a user interface coupled to the network for allowing a user to input and/or modify at least one of the scheduling data and the advertising content.

5. The system recited in claim 1, wherein the scheduling data is stored in the database with the advertising content.

6. The system recited in claim 4, wherein a signature associated with the scheduling data is stored with the advertising content.

7. The system recited in claim 1, wherein the scheduling data is stored in a database separate from the database in which the advertising content is stored.

8. The system recited in claim 1, and further comprising a user interface coupled to the network for updating the scheduling data.

9. The system recited in claim 1, wherein advertising content from a variety of channels is distributed simultaneously to various ones of the plurality of remote display devices.

10. The system recited in claim 1, wherein the database can receive and store and can be queried for information associated with at least one of the group consisting of billing, statistical analysis, merchandise, and performance monitoring.

11. The system recited in claim 1, and further comprising a gaming device coupled to the server, the gaming device being capable of communicating advertising content associated with gaming.

* * * * *